United States Patent [19]
Mink et al.

[11] Patent Number: 5,614,456
[45] Date of Patent: Mar. 25, 1997

[54] CATALYST FOR BIMODAL MOLECULAR WEIGHT DISTRIBUTION ETHYLENE POLYMERS AND COPOLYMERS

[75] Inventors: Robert I. Mink, Warren; Thomas E. Nowlin, West Windsor; Sandra D. Schregenberger, Neshanic; Pradeep P. Shirodkar, Somerset; Grace O. Tsien, Colonia, all of N.J.

[73] Assignee: Mobil Oil Corporation, Fairfax, Va.

[21] Appl. No.: 333,684

[22] Filed: Nov. 3, 1994

Related U.S. Application Data

[63] Continuation-in-part of Ser. No. 151,664, Nov. 15, 1993, abandoned.
[51] Int. Cl.⁶ .............................. B01J 31/00; B01J 31/16; B01J 31/22
[52] U.S. Cl. .......................... 502/115; 502/104; 502/107; 502/113; 502/117
[58] Field of Search ................................... 502/104, 107, 502/113, 115, 117

[56] References Cited

U.S. PATENT DOCUMENTS

| | | | |
|---|---|---|---|
| 3,135,809 | 6/1964 | Bosmajian | 260/650 |
| 3,950,269 | 4/1976 | Setterquist | 252/430 |
| 4,188,470 | 2/1980 | Collina et al. | 526/64 |
| 4,299,936 | 11/1981 | Candlin et al. | 526/119 |
| 4,324,691 | 4/1982 | Hartshorn et al. | 252/429 B |
| 4,338,424 | 7/1982 | Morita et al. | 526/65 |
| 4,404,344 | 9/1983 | Sinn et al. | 526/160 |
| 4,414,369 | 11/1983 | Kuroda et al. | 526/65 |
| 4,420,592 | 12/1983 | Kato et al. | 526/65 |
| 4,525,550 | 6/1985 | Warzelhan et al. | 526/116 |
| 4,530,914 | 7/1985 | Ewen et al. | 502/113 |
| 4,536,484 | 8/1985 | Lacombe et al. | 502/62 |
| 4,542,199 | 9/1985 | Kaminsky et al. | 526/160 |
| 4,568,659 | 2/1986 | Warzelhan et al. | 502/111 |
| 4,578,373 | 3/1986 | Graves | 502/113 |
| 4,658,078 | 4/1987 | Slaugh et al. | 585/512 |
| 4,665,047 | 5/1987 | Slaugh et al. | 502/108 |
| 4,701,432 | 10/1987 | Welborn, Jr. | 502/113 |
| 4,703,094 | 10/1987 | Raufast | 526/65 |
| 4,710,552 | 12/1987 | Bachl et al. | 526/116 |
| 4,752,597 | 6/1988 | Turner | 502/104 |
| 4,769,510 | 9/1988 | Kaminsky et al. | 585/512 |
| 4,794,096 | 12/1988 | Ewen | 502/117 |

(List continued on next page.)

FOREIGN PATENT DOCUMENTS

| | | |
|---|---|---|
| 0515132 | 11/1992 | European Pat. Off. . |
| 0516458 | 12/1992 | European Pat. Off. . |

OTHER PUBLICATIONS

Kaminsky, Walter, "Influence of hydrogen on the polymerization of ethylene with the homogeneous Ziegler system bis(cyclopentadienyl)zirconiumdichloride/aluminoxane", Makromol. Chem., pp. 225–228, (1984).

Kaminsky, Walter, "Living Polymers on Polymerization with Extremely Productive Ziegler Catalysts", Agnew. Chem. Int. Ed. Engl. 19, pp. 390–392, (1980).

Kaminsky, Walter, "Isotactic Polymerization of propene with (N–1,1'–ethylenedi–4,5,6,7–tetrahydroindenyl)zirconium dichloride combined with methylaluminoxane", Makromol. Chem., pp. 305–310, (1987).

Kaminsky, Walter, "Bis(cyclopentadienyl)zirkon–Verbindungen und Aluminoxan als Ziegler–Katalysatoren fur die Polymerisation und Copolymerisation von Olefinen," Makromol. Chem., pp. 417–421, (1983).

Kaminsky, Walter, "Metallocene Catalysts", University of Hamburg, (1992).

*Primary Examiner*—Asok Pal
*Attorney, Agent, or Firm*—M. V. Schneller; M. D. Keen

[57] ABSTRACT

The interaction of silica, previously calcined at 600° C., with dibutylmagnesium (DBM), 1-butanol and titanium tetrachloride and a solution of methylalumoxane (MAO) and $(BuCp)_2ZrCl_2$ provides a catalyst that, in the absence of a trialkylaluminum $(AlR_3)$ cocatalyst, produces polyethylene with a bimodal MWD.

16 Claims, 1 Drawing Sheet

U.S. PATENT DOCUMENTS

| | | | |
|---|---|---|---|
| 4,808,561 | 2/1989 | Welborn, Jr. | 502/104 |
| 4,814,540 | 3/1989 | Watanabe et al. | 585/523 |
| 4,820,786 | 4/1989 | Bacskai | 526/152 |
| 4,871,704 | 10/1989 | Kohara et al. | 502/114 |
| 4,874,734 | 10/1989 | Kioka et al. | 502/104 |
| 4,897,455 | 1/1990 | Welborn, Jr. | 526/129 |
| 4,912,075 | 3/1990 | Chang | 502/107 |
| 4,914,253 | 4/1990 | Chang | 585/523 |
| 4,918,038 | 4/1990 | Samuels et al. | 502/112 |
| 4,923,833 | 5/1990 | Kioka et al. | 502/9 |
| 4,925,821 | 5/1990 | Chang | 502/107 |
| 4,931,517 | 6/1990 | Fujita | 526/128 |
| 4,933,403 | 6/1990 | Kaminsky et al. | 526/160 |
| 4,935,397 | 6/1990 | Chang | 502/117 |
| 4,937,217 | 6/1990 | Chang | 502/111 |
| 4,937,301 | 6/1990 | Chang | 526/128 |
| 4,962,248 | 10/1990 | Winter et al. | 585/12 |
| 4,962,262 | 10/1990 | Winter et al. | 585/512 |
| 5,001,205 | 3/1991 | Hoel | 526/128 |
| 5,006,500 | 4/1991 | Chang | 502/107 |
| 5,008,228 | 4/1991 | Chang | 502/111 |
| 5,023,388 | 6/1991 | Luker | 585/9 |
| 5,026,797 | 6/1991 | Takahashi | 526/124 |
| 5,032,562 | 7/1991 | Lo et al. | 502/111 |
| 5,043,515 | 8/1991 | Slaugh et al. | 585/512 |
| 5,055,438 | 10/1991 | Canich | 502/117 |
| 5,057,475 | 10/1991 | Canich et al. | 502/104 |
| 5,066,631 | 11/1991 | Sangokoya et al. | 502/152 |
| 5,077,255 | 12/1991 | Welborn, Jr. | 502/204 |
| 5,086,024 | 2/1992 | Crapo et al. | 502/117 |
| 5,086,135 | 2/1992 | Kissin | 526/151 |
| 5,087,788 | 2/1992 | Wu | 585/512 |
| 5,091,352 | 2/1992 | Kioka et al. | 502/103 |
| 5,124,418 | 6/1992 | Welborn, Jr. | 526/114 |
| 5,126,303 | 6/1992 | Resconi et al. | 502/117 |
| 5,132,262 | 7/1992 | Rieger et al. | 502/117 |
| 5,132,381 | 7/1992 | Winter et al. | 526/160 |
| 5,145,819 | 9/1992 | Winter et al. | 502/117 |
| 5,147,949 | 9/1992 | Chang | 526/129 |
| 5,157,008 | 10/1992 | Sangokoya et al. | 502/111 |
| 5,171,799 | 12/1992 | Kioka et al. | 26/127 |
| 5,171,871 | 12/1992 | Miyashita | 556/27 |
| 5,171,919 | 12/1992 | Watanabe et al. | 585/523 |
| 5,196,496 | 3/1993 | Galimberti et al. | 526/348.6 |
| 5,198,399 | 3/1993 | Hoff et al. | 502/111 |
| 5,206,197 | 4/1993 | Campbell, Jr. | 502/103 |
| 5,206,199 | 4/1993 | Kioka et al. | 502/117 |
| 5,208,304 | 5/1993 | Waymouth | 526/164 |
| 5,216,095 | 6/1993 | Dolle et al. | 526/127 |
| 5,223,465 | 6/1993 | Ueki et al. | 502/117 |
| 5,225,500 | 7/1993 | Elder et al. | 526/127 |
| 5,234,878 | 8/1993 | Tsutsui et al. | 502/103 |
| 5,238,891 | 8/1993 | Miro | 502/104 |
| 5,238,892 | 8/1993 | Chang | 502/111 |
| 5,240,894 | 8/1993 | Burkhardt et al. | 502/108 |
| 5,241,025 | 8/1993 | Hlatky et al. | 526/129 |
| 5,242,876 | 9/1993 | Shamshoum et al. | 502/113 |
| 5,305,816 | 5/1994 | Tsutsui et al. | 502/108 |
| 5,324,800 | 6/1994 | Welborn, Jr. et al. | 526/160 |

CATALYST FOR BIMODAL MOLECULAR WEIGHT DISTRIBUTION ETHYLENE POLYMERS AND COPOLYMERS

CROSS-REFERENCE TO RELATED APPLICATIONS

This is a continuation in part of Ser. No. 08/151,664 filed Nov. 15, 1993, now abandoned.

FIELD OF INVENTION

The invention relates to a catalyst and its use in the preparation of bimodal molecular weight distribution (MWD) polymers and copolymers of ethylene, in one reactor. The catalyst comprises at least two transition metal components on a support; one of the two transition metal components is provided in the form of a metallocene. The supported transition metals are activated by oligomeric and/or polymeric oxygen-containing compounds of aluminum. Products of polymerization in the presence of the catalysts comprise two components with significantly different molecular weights, thus one being of relatively higher molecular weight than the other; such polymerization products are referred to as bimodal molecular weight distribution products.

The catalysts can be run in a conventional gas phase fluidized bed reactor without reactor fouling and without using an alumoxane cofeed to the polymerization reactor. Accordingly, the catalyst of the invention is useful in continuous polymerization and copolymerization of ethylene in a conventional gas phase fluidized bed reactor without reactor fouling.

BACKGROUND OF THE INVENTION

Presently, high density polyethylene (HDPE) with a bimodal MWD is produced with a tandem reactor process involving two or more polymerization reactors. In such a process, the catalyst is exposed to one of the reactors in the presence of very low levels of hydrogen as chain transfer agent, and then transferred into a second reactor with relatively large amounts of hydrogen. Under these conditions the first reactor product is the relatively high-molecular weight (HMW) component, while the second reactor produces the relatively low-molecular weight (LMW) component.

Titanium/zirconium-based bimetallic catalyst systems that produce broad/bimodal molecular weight distribution polyethylene resins in a single reactor have been described. The LMW component is produced by the Zr site, while the HMW component is produced by the Ti site. The relative productivity of the two sites determines the weight fraction of each of the HMW/LMW components in the final product. As with typical Ziegler/Natta catalysts, an aluminumalkyl cocatalyst is usually added to the polymerization reactor (either slurry or gas phase) in order to activate the catalyst to produce polyethylene.

The use of metallocene compounds of transition metals as catalysts for polymerization and copolymerization of ethylene is a relatively recent development. Metallocenes can be described by the empirical formula $Cp_mMA_nB_p$. These compounds have been used to produce olefin polymers and copolymers, such as ethylene and propylene homopolymers, ethylene-butene and ethylene-hexene copolymers. Metallocene catalysts containing a second transition metal, such as titanium have been developed which produce bimodal molecular weight distribution products, having a high molecular weight component and a relatively lower molecular weight component. Such developments provide a commercial alternative to processes which require two or more reactors to produce bimodal molecular weight distribution product(s) with production of one of the molecular weight components in a first reactor and transfer of that component to a second reactor and completion of the polymerization with production of the other component of different molecular weight.

Metallocenes can be activated with alumoxanes, e.g. methylalumoxane (MAO). The class of alumoxanes comprises oligomeric linear and/or cyclic alkylalumoxanes represented by the formula: $R-(Al(R)-O)_n-AlR_2$ for oligomeric, linear alumoxanes and $(-Al(R)-O-)_m$ for oligomeric cyclic alumoxanes wherein n is 1–40, preferably 10–20, m is 3–40, preferably 3–20 and R is a $C_1$–$C_8$ alkyl group and preferably methyl. Methylalumoxane is commonly produced by reacting trimethylaluminum with water or with hydrated inorganic salts, such as $CuSO_4·5H_2O$ or $Al_2(SO_4)_3·5H_2O$. Methylalumoxane can be also generated in situ in polymerization reactors by adding to the reactor trimethylaluminum and water or water-containing inorganic salts. MAO is a mixture of oligomers with a very wide distribution of molecular weights and usually with an average molecular weight of about 1200. MAO is typically kept in solution in toluene. While the MAO solutions remain liquid at fluidized bed reactor temperatures, the MAO itself is a solid at room temperature. Most of the experiments reported in the literature relating to methylalumoxane used as a cocatalyst with metallocene compounds are undertaken in a slurry or solution process, rather than in a gas phase fluidized bed reactor process. Reactor fouling results when MAO solutions are fed directly into the gas phase reactor in large enough quantities to provide liquid contact with the metallocene component of the catalyst. The fouling occurs because the MAO solution forms a liquid film on the interior walls of the reactor. The catalyst is activated when it comes into contact with this liquid film, and the activated catalyst reacts with ethylene to form a polymer coating which grows larger in size until the reactor is fouled. In addition, since substantially all of the activation takes place on the walls, the MAO is not uniformly distributed to the catalyst particles. The resulting non-homogeneous polymerization gives low catalyst activity and poor product properties.

Activation of the metallocene component of a bimetallic catalyst is via the alumoxane. A separate trialkylaluminum feed was used to activative the non-metallocene component of the bimetallic catalyst.

SUMMARY OF THE INVENTION

The catalyst comprises at least two transition metal components on a support; one of the two transition metal components is provided in the form of a metallocene. The supported transition metals are activated by methylalumoxane during catalyst preparation. Polymerization products comprise two components of different molecular weights, thus one being of relatively higher molecular weight than the other.

In accordance with the invention, polyethylene with a bimodal MWD can be prepared in a single reactor by the catalyst of this invention without adding a separate aluminumalkyl cocatalyst to the polymerization reactor. Specifically, a supported non-metallocene transition metal compound, free of an activator therefor such as an alkylaluminum compound (e.g., trialkylaluminum, dialkylaluminum halides and hydrides), is activated by contacting the supported catalyst containing a non-metallocene transition metal with a solution containing both a metallocene compound and an aluminoxane compound. No separate feed of alumoxane or a trialkyl aluminum compound to the polymerization reactor (slurry or fluidized bed) is necessary.

DETAILED DESCRIPTION OF THE INVENTION

Figure 1:
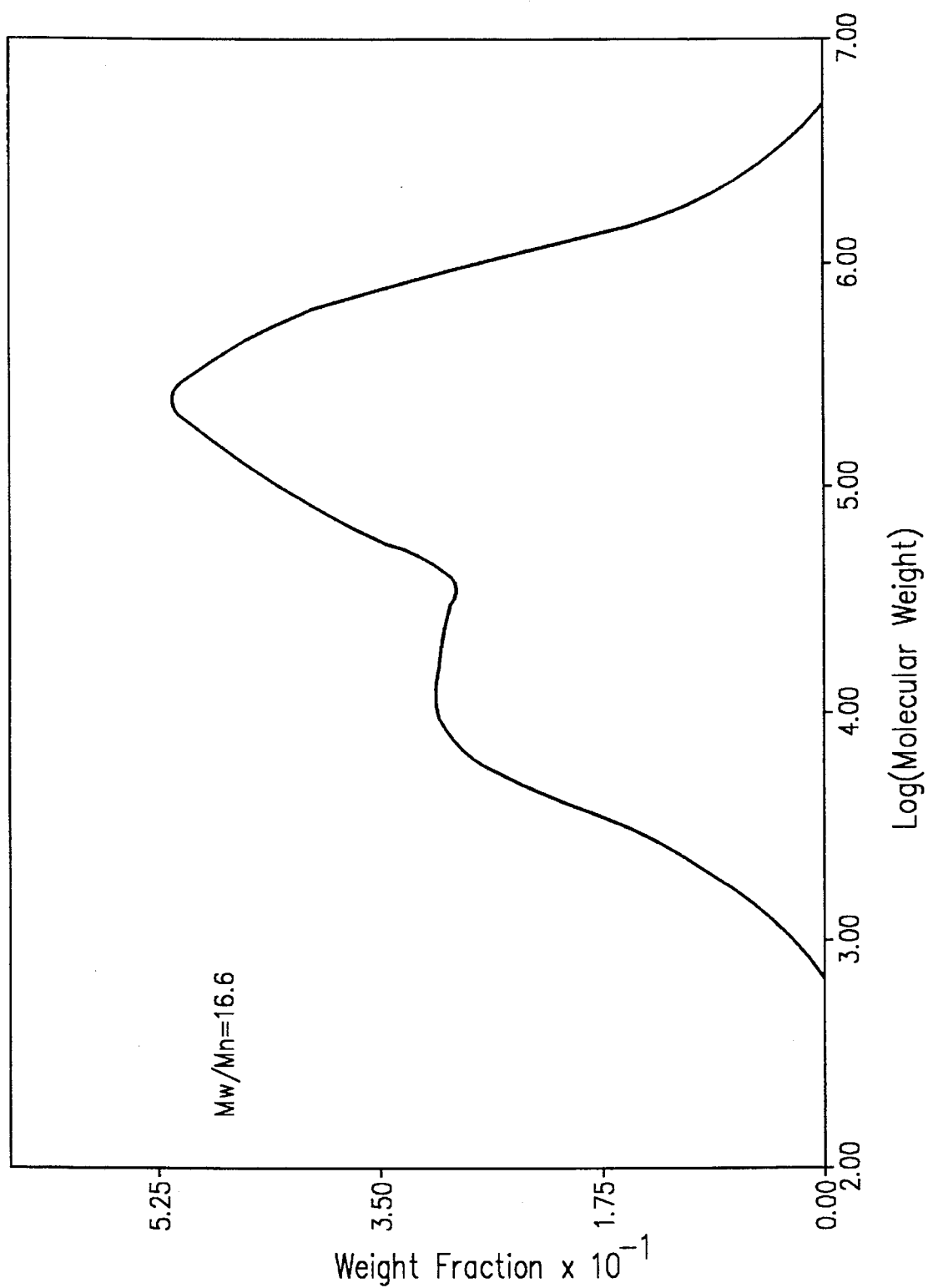
FIG. 1 is a gel permeation chromatogram of a bimodal molecular weight distribution product of the Examples.

A supported non-metallocene transition metal compound, free of an activator such as an alkylaluminum (e.g., trialkylaluminum, dialkylaluminum halides and hydrides), referred hereinafter as non-metallocene transition metal, is activated by contacting with a solution containing an alumoxane alone or in admixture with a metallocene compound.

The invention relates to a catalyst and its use in the preparation of bimodal molecular weight distribution polymers and copolymers of ethylene, prepared in one reactor. The catalyst comprises at least two transition metal components on a support; one of the two transition metal components is provided in the form of a metallocene. The supported transition metals are activated during catalyst preparation. In accordance with the invention, no aluminum alkyl compound feed to the reactor (slurry or gas phase fluidized bed) is required.

In a preferred embodiment, the catalysts of the invention consist of a supported non-metallocene transition metal component, a metallocene transition metal compound and methylalumoxane.

The carrier material is a solid, particulate, porous, preferably inorganic material, such as an oxide of silicon and/or of aluminum. The carrier material is used in the form of a dry powder having an average particle size of from about 1 micron to about 500 microns, preferably from about 10 microns to about 250 microns. The surface area of the carrier is at least about 3 square meters per gram (m²/g), and preferably at least about 50 m²/g up to about 350 m²/g. The carrier material should be dry, that is, free of absorbed water. Drying of the carrier material can be effected by heating at about 100° C. to about 1000° C., preferably at about 600° C. When the carrier is silica, it is heated to at least 200° C., preferably about 200° C. to about 850° C. and most preferably at about 600° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 600° C. for about 16 hours to achieve a surface hydroxyl group concentration of about 0.7 millimoles per gram (mmol/g). The silica of the most preferred embodiment is a high surface area, amorphous silica (surface area =300 m²/g; pore volume of about 1.65 cm³/g), and it is a material marketed under the tradenames of Davison 952 or Davison 955 by the Davison Chemical Division of W. R. Grace and Company. The silica is in the form of spherical particles, e.g., as obtained by a spray-drying process. As procured, these silicas are not calcined; and this must be dehydrated, as indicated above.

The catalyst synthesis is undertaken under inert conditions, in the absence of water and of oxygen.

The carrier material, having said (OH) groups, is slurried in a non-polar solvent and the resulting slurry is contacted with at least one organomagnesium compound having the empirical formula below. The slurry of the carrier material in the solvent is prepared by introducing the carrier into the solvent, preferably while stirring, and heating the mixture to about 25° to about 70° C., preferably to about 40° to about 60° C. Temperatures here are critical with respect to the non-metallocene transition metal which is subsequently added; that is temperatures in this slurry of about 90° C. or higher result in deactivation of the non-metallocene transition metal added subsequently. Accordingly, all catalyst precursor synthesis steps are conducted below 90° C. The slurry is then contacted with the aforementioned organomagnesium compound, while the heating is continued as indicated.

The organomagnesium compound has the empirical formula

RMgR' where R and R' are the same or different $C_2$–$C_{12}$ alkyl groups, preferably $C_4$–$C_{10}$ alkyl groups, more preferably $C_4$–$C_8$ alkyl groups, and most preferably both R and R' are mostly butyl groups.

Suitable non-polar solvents are materials in which the reactants used herein, i.e., the organomagnesium compound, and the non-metallocene transition metal compound, are soluble. Preferred non-polar solvents are alkanes, such as isopentane, hexane, n-heptane, octane, nonane, and decane, although a variety of other materials including cycloalkanes, such as cyclohexane, aromatics, such as benzene, toluene and ethylbenzene, may also be employed. The most preferred non-polar solvent is isopentane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium compound that will be deposited—physically or chemically—onto the support since any excess of the organomagnesium compound in the solution may react with other synthesis chemicals and precipitate outside of the support. The carrier drying temperature affects the number of sites on the carrier available for the organomagnesium compound—the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited onto the support without leaving any excess of the organomagnesium compound in the solution. Thus, the molar ratios given below are intended only as an approximate guideline and the exact amount of the organomagnesium compound in this embodiment must be controlled by the functional limitation discussed above, i.e., it must not be greater than that which can be deposited onto the support. If greater than that amount is added to the solvent, the excess may react with the non-metallocene transition metal compound, thereby forming a precipitate outside of the support which is detrimental in the synthesis of our catalyst and must be avoided. The amount of the organomagnesium compound which is not greater than that deposited onto the support can be determined in any conventional manner, e.g., by adding the organomagnesium compound to the slurry of the carrier in the solvent, while stirring the slurry, until the organomagnesium compound is detected in the solvent.

For example, for the silica carrier heated at about 600° C., the amount of the organomagnesium compound added to the slurry is such that the molar ratio of Mg to the hydroxyl groups (OH) on the solid carrier is about 0.5:1 to about 4:1, preferably about 0.8:1 to about 3:1, more preferably about 0.9:1 to about 2:1 and most preferably about 1:1. The organomagnesium compound dissolves in the non-polar solvent to form a solution from which the organomagnesium compound is deposited onto the carrier.

It is also possible to add such an amount of the organomagesium compound which is in excess of that which will be deposited onto the support, and then remove, e.g., by filtration and washing, any excess of the organomagnesium compound. However, this alternative is less desirable than the most preferred embodiment described above.

The organomagnesium treated support is contacted with an organic alcohol reagent (R"OH). The amount of this organic alcohol reagent is effective to provide a R"OH:Mg ratio of 0.5 to 2.0, preferably 0.8 to 1.5.

Contact of the silica supported magnesium compound, with the organic alcohol reagent is undertaken in the slurry. Contact is undertaken at a temperature ranging from 25° C. to 90° C., preferably 40° C. to 60° C.

The alkyl group in the organic alcohol reagent can contain 1 to 12 carbon atoms, preferably 1 to 8; in the embodiments below, it is an alkyl containing 2 to 4 carbon atoms, particularly of 4 carbon atoms (butyl). The inclusion of the alcohol reagent step in the catalyst synthesis of the invention produces a catalyst which, relative to the absence of this step, is much more active, requires much less non-metallocene transition metal compound (e.g. titanium), and is much more active with respect to the product component produced with the metallocene component.

After the addition of the organic alcohol reagent to the slurry is completed, the slurry is contacted with a non-metallocene transition metal compound. The slurry temperature must be maintained at about 25° to about 90° C., preferably to about 40° to about 60° C. As noted above, temperatures in this slurry of about 90° C. or greater result in deactivation of the catalyst. Suitable non-metallocene transition metal compounds used herein are compounds of metals of Groups 4, and 5, of the Periodic Chart of the Elements, as published by Chemical and Engineering News, 63(5), 27, 1985, providing that such compounds are soluble in the non-polar solvents. Non-limiting examples of such compounds are titanium and vanadium halides, e.g., titanium tetrachloride, $TICl_4$, vanadium tetrachloride, $VCl_4$, vanadium oxytrichloride, $VOCl_3$, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride. The amount of titanium or vanadium, in non-metallocene form ranges from a Ti/Mg molar ratio of 0.3 to 1.0, preferably from 0.50 to 0.80.

Mixtures of such non-metallocene transition metal compounds may also be used and generally no restrictions are imposed on the transition metal compounds which may be included. Any transition metal compound that may be used alone may also be used in conjunction with other transition metal compounds.

After the addition of the non-metallocene transition metal compound is complete, the slurry solvent is removed by evaporation or filtering to obtain a free-flowing powder. Next, incorporation of the metallocene component can be undertaken. The metallocene is activated with an alumoxane.

The metallocene compound has the formula $Cp_xM_yB_z$ in which Cp is an unsubstituted or substituted cyclopentadienyl group, M is zirconium or hafnium and A and B belong to the group including a halogen atom, hydrogen atom or an alkyl group. In the above formula of the metallocene compound, the preferred transition metal atom M is zirconium. In the above formula of the metallocene compound, the Cp group is an unsubstituted, a mono- or a polysubstituted cyclopentadienyl group: and x is at least 1. The substituents on the cyclopentadienyl group can be preferably straight-chain $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when x in the above formula of the metallocene compound is equal to 2, the cyclopentadienyl groups can be also bridged by polymethylene or dialkylsilane groups, such as —$CH_2$—, —$CH_2$—$CH_2$—, —CR'R"— and —CR'R"—CR'R"— where R' and R" are short alkyl groups or hydrogen atoms, —$Si(CH_3)_2$—, $Si(CH_3)_2$—$CH_2$—$CH_2$—$Si(CH_3)_2$— and similar bridge groups. The A and B substituents in the above formula of the metallocene compound may be halogen atoms; and y+z is 3 or less, provided that x+y+z equals the valence of M. If the substituents A and B in the above formula of the metallocene compound are alkyl groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1$–$C_6$ alkyls. Illustrative, but non-limiting examples of metallocenes include bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, 1,2-ethylene bis(indenyl)zirconium dichloride, 1,1-ethylene bis(indenyl)zirconium dichloride, bis(cyclopentadienyl)hafnium hydridochloride, bis(n-butylcyclopentadienl)zirconium dichloride, bis(n-butylcyclopentadienyl)hafnium dichloride, bis(n-butylcyclopentadienyl)zirconium dimethyl, bis(n-butylcyclopentadienyl)hafnium dimethyl, bis(n-butylcyclopentadienyl)zirconium hydridochloride, bis(n-butylcyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, cyclopentadienylzirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)] zirconium dichloride. The metallocene compounds utilized within the embodiment of this art can be used as crystalline solids, as solutions in hydrocarbons or in a supported form.

The alumoxane can be impregnated into the carrier at any stage of the process of catalyst preparation. In this embodiment, the amount of Al, provided by alumoxane, is sufficient to provide an Al:transition metal (provided by metallocene) molar ratio ranging from 50 to 500, preferably 75 to 300.

The class of alumoxanes comprises oligomeric linear and/or cyclic alkylalumoxanes represented by the formula: R—(Al(R)—O)$_n$—AlR$_2$ for oligomeric, linear alumoxanes and (—Al(R)—O—)$_m$ for oligomeric cyclic alumoxanes wherein n is 1–40, preferably 10–20, m is 3–40, preferably 3–20 and R is a C$_1$–C$_8$ alkyl group and preferably methyl. MAO is a mixture of oligomers with a very wide distribution of molecular weights and usually with an average molecular weight of about 1200. Both the titanium and zirconium active sites may be activated by commercially-available methylalumoxane. The most preferred activator for the zirconium sites is methylalumoxane. In the most preferred embodiment the addition of such a commercial methylalumoxane to the catalyst precursor is sufficient to activate both the zirconium sites and the titanium and/or vanadium sites.

Incorporation of the activated metallocene component onto the carrier can be accomplished in various ways. Incorporation of either or both the alumoxane and the metallocene compound can be into the slurry resulting from the addition, i.e. after the addition of the non-metallocene transition metal compound.

Alternatively, and in accordance with the unique method of infusion of alumoxane into the pores of the carrier, the carrier slurry can be stripped of solvent, after the addition of the non-metallocene transition metal compound, to form a free-flowing powder. The free flowing powder can then be impregnated by determining the pore volume of the carrier and providing an alumoxane (or metallocene-alumoxane) solution in a volume equal to or less than the total pore volume of the carrier, and recovering a dry catalyst precursor. The resulting free-flowing powder does not need to be combined with an activator (sometimes referred as a cocatalyst) in the polymerization reactor.

The volume of the solution comprising the alumoxane and a solvent therefor can vary. In a preferred embodiment, of alumoxane incorporation into the carrier, one of the controlling factors in the alumoxane incorporation into the carrier material catalyst synthesis is the pore volume of the support. In this preferred embodiment, the process of impregnating the carrier material is by infusion of the alumoxane solution, without forming a slurry of the carrier material, such as silica, in the alumoxane solution. The volume of the solution of the alumoxane is sufficient to fill the pores of the carrier material without forming a slurry in which the volume of the solution exceeds the pore volume of the silica; accordingly and preferably, the maximum volume of the alumoxane solution is, does not exceed, the total pore volume of the carrier material sample. That maximum volume of the alumoxane solution insures that no slurry of the carrier material is formed. Accordingly, if the pore volume of the carrier material is 1.65 cm$^3$/g, then the volume of alumoxane solution will be equal to or less than 1.65 cm$^3$/g of carrier material. As a result of this proviso, the impregnated carrier material will appear dry immediatedly following impregnation although the pores of the carrier will be filled with inter alia solvent.

Solvent may be removed from the alumoxane impregnated pores of the carrier material by heating and/or under a positive pressure induced by a flow of an inert gas, such as nitrogen. If employed, the conditions in this step are controlled to reduce, if not to eliminate, agglomeration of impregnated carrier particles and/or crosslinking of the alumoxane. In this step, solvent can be removed by evaporation effected at relatively low elevated temperatures of above about 40° C. and below about 50° C. to obviate agglomeration of catalyst particles and crosslinking of the alumoxane. Although solvent can be removed by evaporation at relatively higher temperatures than that defined by the range above 40° C. and below about 50° C., very short heating times schedules must be employed to obviate agglomeration of catalyst particles and crosslinking of the alumoxane or catalyst deactivation.

In a preferred embodiment, the metallocene is added to the solution of the alumoxane prior to impregnating the carrier with the solution. Again, as noted above, the maximum volume of the alumoxane solution also including the metallocene is the total pore volume of the carrier material sample. The molar ratio of alumoxane provided aluminum, expressed as Al, to metallocene metal expressed as M (e.g. Zr), ranges from 50 to 500, preferably 75 to 300, and most preferably 100 to 200. An added advantage of the present invention is that this Al:Zr ratio can be directly controlled. In a preferred embodiment the alumoxane and metallocene compound are mixed together at a temperature of about 20° to 80° C., for 0.01 to 6.0 hours, prior to use in the infusion step. The solvent for the metallocene and alumoxane can be appropriate solvents, such as aromatic hydrocarbons, ethers, cyclic ethers or esters, preferably it is toluene.

The catalyst precursor component formed from the organomagnesium compound, the non-metallocene transition metal compound and the activated metallocene, need not be further activated with a cocatalyst, such as an alkylaluminum compound. Moreover, use of this catalyst does not require alumoxane cofeed to the reactor.

The amount of alumoxane is sufficient to give an Al:Ti molar ratio of about 5:1 to about 1000:1, preferably about 15:1 to about 300:1, and most preferably about 20:1 to about 100:1. The catalyst exhibits high activity for long periods of time, and exhibits little deactivation.

The catalyst can be fed to the fluidized bed reactor for gas phase polymerizations and copolymerizations of ethylene in particulate form. Moreover, in accordance with the invention, the catalyst can be fed to the fluidized bed reactor for polymerizations and copolymerizations of ethylene in the absence of alumoxane solution. It is essential to operate the fluidized bed reactor at a temperature below the sintering temperature of the polymer particles. For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density (g/cc) of about 0.91 to 0.92, and temperatures of about 80° to 100° C. are used to prepare products having a density of about 0.92 to 0.94, and temperatures of about 90° to 115° C. are used to prepare products having a density of about 0.94 to 0.96. A fluidized bed reactor polymerization in accordance is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

Products

Polymerization products comprise two components of different molecular weight, with one MW component being of relatively higher molecular weight than the other. The relatively higher molecular weight component, of the bimodal molecular weight distribution product, has a relatively narrow molecular weight distribution.

Ethylene polymers, as well as copolymers of ethylene with one or more C$_3$–C$_{10}$ alpha-olefins, can be produced in accordance with the invention. Thus, copolymers having two monomeric units are possible as well as terpolymers having three monomeric units. Particular examples of such polymers include ethylene/1-butene copolymers, ethylene/1-hexene copolymers and ethylene/4-methyl-1-pentene copolymers.

Hydrogen may be used as a chain transfer agent in the polymerization reaction of the present invention. The ratio of hydrogen/ethylene employed will vary between about 0 to about 2.0 moles of hydrogen per mole of ethylene in the gas phase. Any gas inert to the catalyst and reactants can also be present in the gas stream.

Ethylene/1-butene and ethylene/1-hexene copolymers are the most preferred copolymers polymerized in the process of and with the catalyst of this invention. The ethylene copolymers produced in accordance with the present invention preferably contain at least about 70 percent by weight of ethylene units. The catalyst of this invention can also be used to polymerize propylene and other alpha-olefins and to copolymerize them.

In another embodiment of the invention, the catalyst of the invention exhibits high activity for polymerization of ethylene and higher alpha-olefins and allows the synthesis of ethylene polymers and copolymers with a broad molecular weight distribution and generally, bimodal molecular weight distribution with a relatively high molecular weight component and with a relatively lower molecular weight component in the resin blend. The molecular weight distribution of the bimodal resin, expressed as Melt Flow Ratio, is about 70 to about 200.

EXAMPLE ILLUSTRATING ESSENCE OF INVENTION (Example 1)

CATALYST PREPARATION

The titanium component of the catalyst was prepared as described in Example 1A. The zirconium component of the catalyst was prepared using a physical "dry" impregnation method described in U.S. Pat. No. 5,332,706, which is relied upon and incorporated by reference herein.

(Example 1A)

TITANIUM CATALYST PREPARATION: 955 silica calcined at 600° C. (541 g) was weighted into a two-gallon stainless steel autoclave containing a stirring paddle. Next, ca. 4.8 liters of dry isopentane was added to the autoclave and the stirring rate was set at 100 rpm. The temperature of the silica/isopentane slurry was 54°–58° C. Next, dibutylmagnesium (389 mmol) was added to the slurry. The contents of the autoclave were stirred for 60 minutes. Then 1-butanol (468 mmol) was added and stirring was continued for one hour. Finally, titanium tetrachloride (233 mmol) was added to the autoclave and stirring continued for 60 minutes. After this time, all solvents were removed by evaporation under a nitrogen purge. The yield of the non-metallocene transition metal component was 480 grams of a white-free flowing powder. Ti found 1.60 wt %; Mg found 1.38 wt %.

(Example 1B)

FINISHED BIMETALLIC CATALYST PREPARATION: Solution (A): $(BuCp)_2ZrCl_2$ (0.096 g, 0.237 mmol) was transferred to a 30 ml serum-bottle and 5.0 ml (4.68 g) of a 4.75 Molar Al (14.1 wt % Al) solution of methylaluminoxane were added. The bottle was shaken for about one minute to form a solution which was used immediately as described below.

Under an inert atmosphere, 2.5 grams of the titanium-containing component described in EXAMPLE 1A was added to a 200 ml pear-flask containing a magnetic stirring bar which was used to agitate the catalyst powder vigorously. Then at room temperature, 3.7 ml of solution (A) described above, was added dropwise to the flask over a 10 minute period. The total volume of solution (A) used was such that the titanium containing catalyst always appeared dry during the entire addition time. However, during this addition time, the white titanium-containing catalyst turned a dark brown color. Finally, the pear flask was placed into an oil bath set at 55°–60° C., and the residual toluene from solution (A) was removed with a nitrogen purge to give a dry, tan, free-flowing powder. Ti: 1.09 wt %; Mg 0.91 wt %; Al 13.1 wt %; Zr 0.42 wt %.

(Example 2)

POLYMERIZATION—Slurry

Polymerization: Ethylene/1-hexene copolymer was prepared with the bimetallic (Ti/Zr) catalyst of EXAMPLE 1B above to produce HDPE with a relatively high molecular weight.

A 1.6 liter stainless steel autoclave, at about 47° C., was filled with 0.750 liters of dry hexane, 0.030 liters of dry 1-hexene while under a slow nitrogen purge. NOTE: No aluminumalkyl cocatalyst was added to the reactor. Next, the reactor vent was closed, the stirring rate was set at about 900 rpm, the internal temperature was increased to 85° C., and the internal pressure was raised from 5 psi to 13 psi with hydrogen. Ethylene was introduced to maintain the reactor pressure at about 200 psi. Next, 0.103 grams of catalyst described in Example 1B was introduced into the reactor with ethylene over-pressure and the temperature was increased and held at 95° C. The polymerization was continued for 60 minutes, and then the ethylene supply was stopped and the reactor allowed to cool to room temperature. 70.8 grams of polyethylene were collected. The HLMI of the polymer was 2.3 indicating a relatively high molecular weight and the GPC chromatogram of this polymer is shown in FIG. 1.

DISCUSSION

The molecular weight distribution (MWD) of polymer from the slurry reactor was examined by Gel Permeation Chromatography (GPC), and the result clearly shows that the polymer has a bimodal MWD with a relatively HMW and relatively LMW component.

What is claimed is:

1. An activated catalyst composition, for producing bimodal molecular weight distribution high density and linear low density polymers and copolymers of ethylene, which activated catalyst does not require a cofeed selected from the group consisting of aluminoxane, trialkyaluminum and mixtures thereof, to the reactor comprising a dry, anhydrous, support containing composition comprising at least two transition metals one of which is provided as a metallocene compound and a second of which is provided as a transition metal source selected from the group consisting of non-metallocene compounds, activated by a solution containing at least one source of aluminum and selected from the group consisting of aluminoxane alone and aluminoxane admixed with metallocene transition-metal compound wherein at least one source of aluminum is present in amounts effective to activate the two transition metals;

wherein the metallocene transition metal is provided as a compound which has the formula $Cp_xMA_yB_z$, wherein Cp is selected from the group consisting of (1) an unsubstituted cyclopentadienyl group; (2) a substituted cyclopentadienyl group, substituted by an alkyl or alkylene group of 1 to 6 carbon atoms; and (3) a cyclopentadienyl group which is part of a bicyclic or a tricyclic moiety, unsubstituted or substituted by an alkyl or alkylene group of 1 to 6 carbon atoms; x is at least 1; each of A and B is a halogen atom or an alkyl group of 1 to 8 carbon atoms, and y plus z is 3 or less provided that x+y+z is equal to the valence of M, which is selected from the group consisting of titanium or zirconium or hafnium;

substituted by an alkyl or alkylene group of 1 to 6 carbon atoms; x is at least 1; each of A and B is a halogen atom or an alkyl group of 1 to 8 carbon atoms, and y plus z is 3 or less provided that x+y+z is equal to the valance of M, which is selected from the group consisting of titanium or zirconium or hafnium.

2. The catalyst of claim 1 wherein the support is the reaction product of (1) silica having OH groups, impregnated with RMgR', wherein each of R and R' is an alkyl group of 4 to 10 carbon atoms, wherein RMgR' is present in an amount to provide a RMgR':OH molar ratio of 0.5:1 to 3:1; and (2) an organic alcohol reagent providing alkoxy groups having a formula R"O—, wherein R" is an alkyl group of 1 to 12 carbons;

wherein said reagent is used in an amount effective to provide an alcohol/Mg molar ratio of 0.5 to 2.0.

3. The catalyst of claim 1 wherein the activated metallocene compound of a transition metal is a zirconocene.

4. The catalyst of claim 2, wherein each of R and R' is an alkyl group of 4 to 8 carbon atoms.

5. The catalyst of claim 2, wherein each of R and R' is a butyl group.

6. The catalyst of claim 1, wherein R is an alkyl group of 1 to 12 carbons.

7. The catalyst of claim 1, wherein R"O— is provided as an alcohol.

8. The catalyst of claim 1, wherein the reaction product is formed by (i) providing a slurry of a non-polar solvent and a solid porous silica having —OH groups;

(ii) impregnating said silica, with RMgR', to form an intermediate (ii), wherein the Mg:OH molar ratio is less than 2, wherein each of said R and R' is an alkyl group of 4 to 10 carbon atoms and is the same or different, wherein said RMgR' is soluble in said non-polar solvent;

(iii) treating the intermediate (ii) with an amount of R"OH, which amount is effective to provide a R"OH:RMgR' molar ratio of 0.5 to 2.0 to form a step (iii) product.

9. The catalyst of claim 8, wherein the non-metallocene transition metal is titanium.

10. The catalyst of claim 9, wherein the non-metallocene transition metal is titanium tetrachloride.

11. The catalyst of claim 10, which further includes a step (iv), after (iii), comprising treating the step (iii) product with $TiCl_4$ to form a titanium containing intermediate; and (v) combining the titanium containing intermediate with a methylalumoxane solution containing a metallocene transition metal compound.

12. The catalyst of claim 11 wherein the activator is methylalumoxane.

13. The catalyst of claim 1, wherein the metallocene transition metal is provided as a compound which has the formula $Cp_xMA_yB_z$, wherein Cp is a cyclopentadienyl group or a cyclopentadienyl group which is part of a bicyclic or a tricyclic moiety, unsubstituted or substituted by an alkyl or alkylene group of 1 to 6 carbon atoms; x is at least 1; each of A and B is a halogen atom or an alkyl group of 1 to 8 carbon atoms, and y plus z is 3 or less provided that x+y+z is equal to the valence of M, which is selected from the group consisting of titanium or zirconium or hafnium.

14. The catalyst of claim 11, wherein the metallocene transition metal is provided as a compound which has the formula $Cp_xM_yB_z$, wherein Cp is a cyclopentadienyl group unsubstituted or substituted by an alkyl or alkylene group of 1 to 6 carbon atoms; x is at least 1; each of A and B is a halogen atom or an alkyl group of 1 to 8 carbon atoms, and y plus z is 3 or less provided that x+y+z is equal to the valence of M, which is selected from the group consisting of titanium or zirconium or hafnium.

15. The catalyst of claim 14, wherein the metallocene compound is selected from the group consisting of bis-(cyclopentadienyl)zirconium dichloride and bis-(n-butylcyclopentadienyl)zirconium dichloride, 1,2-ethylene bis(indenyl)zirconium dichloride and 1,,1-ethylene bis(indenyl)zirconium dichloride.

16. The catalyst of claim 15, wherein the metallocene compound is activated with a solution of methylalumoxane; wherein the silica has a pore volume in the range of 1.0 cc/g to 4.0 cc/g; wherein the solution has a volume which is equal to the total pore volume.

* * * * *